US008674031B2

(12) United States Patent
Ueda et al.

(10) Patent No.: US 8,674,031 B2
(45) Date of Patent: Mar. 18, 2014

(54) METHOD OF PREPARING WATER- AND OIL-REPELLENT SOIL-RESISTANT COMPOSITION

(75) Inventors: Akihiko Ueda, Tokyo (JP); Yasuo Itami, Osaka (JP); Tetsuya Masutani, Osaka (JP); Peter Cheshire Hupfield, Dyfed (GB); Janet Smith, Swartz Creek, MI (US); Jean-Paul Lecomte, Brussels (BE)

(73) Assignees: Daikin Industries, Ltd., Osaka (JP); Dow Corning Corporation, Midland, MI (US)

( * ) Notice: Subject to any disclaimer, the term of this patent is extended or adjusted under 35 U.S.C. 154(b) by 141 days.

(21) Appl. No.: 13/128,464

(22) PCT Filed: Nov. 10, 2009

(86) PCT No.: PCT/JP2009/069413
§ 371 (c)(1),
(2), (4) Date: Jul. 27, 2011

(87) PCT Pub. No.: WO2010/055932
PCT Pub. Date: May 20, 2010

(65) Prior Publication Data
US 2011/0306713 A1 Dec. 15, 2011

Related U.S. Application Data

(60) Provisional application No. 61/113,320, filed on Nov. 11, 2008.

(51) Int. Cl.
*B32B 13/04* (2006.01)
*B32B 9/04* (2006.01)
*B32B 27/30* (2006.01)
*C08F 20/24* (2006.01)

(52) U.S. Cl.
USPC ........... 525/342; 428/447; 428/500; 428/522; 525/326.2; 525/326.5; 525/330.3; 526/242; 526/245; 526/279

(58) Field of Classification Search
None
See application file for complete search history.

(56) References Cited

U.S. PATENT DOCUMENTS 4,062,451 A * 12/1977 Gander ...................... 206/524.2
4,366,300 A 12/1982 Delescluse
4,886,862 A * 12/1989 Kuwamura et al. ........... 526/247
5,859,123 A * 1/1999 Kobayashi et al. ........... 524/805
6,794,469 B2 * 9/2004 Obayashi et al. ............. 526/247
2006/0173147 A1 8/2006 Fukuda
2007/0066780 A1 3/2007 Ueda et al.
2007/0197717 A1 8/2007 Ueda et al.

FOREIGN PATENT DOCUMENTS

| EP | 1 225 187 A1 | 7/2002 |
| JP | 57023662 A | 2/1982 |
| JP | 7109317 A | 4/1995 |
| JP | 11507687 T | 7/1999 |
| WO | WO 96/16630 * | 6/1996 |
| WO | 97/00230 A1 | 1/1997 |
| WO | 03/018508 A1 | 3/2003 |
| WO | 2004/041880 A1 | 5/2004 |
| WO | 2004/108779 A1 | 12/2004 |
| WO | 2005097850 A1 | 10/2005 |
| WO | 2007/127267 A2 | 8/2007 |
| WO | WO 2007/127267 * | 11/2007 |

OTHER PUBLICATIONS

US Environmental Protection Agency, Office of Pollution Prevention and Toxics, Risk Assessment Division, "Preliminary Risk Assessment of the Developmental Toxicity Associate with Exposure to Perfluorooctanoic Acid and its Salts", Apr. 10, 2003, http://www.epa.gov/opptintr/pfoa/pfoara.pdf.
US Environmental Protection Agency, "Perfluorooctanoic Acid (PFOA), Fluorinated Telomers; Request for Comment, Solicitation of Interested Parties for Enforceable Consent Agreement Development, and notice of Public Meeting", Federal Register, vol. 68, No. 73, Wednesday, Apr. 16, 2003/Notices, 18626-18633, [FRL-7303-8], http://www.epa.gov/opptintr/pfoa/pfoafr.pdf.
US Environmental Protection Agency, "EPA Intensifies Scientific Investigation of a Chemical Processing Aid", EPA Environmental News, Monday Apr. 14, 2003, http://www.epa.gov/opptintr/pfoa/pfoaprs.pdf.
US Environmental Protection Agency, EPA Oppt Fact Sheet, Apr. 14, 2003, http://www.epa.gov/opptintr/pfoa/pfoafacts.pdf.
Search Report and Written Opinion for International Application No. PCT/JP2009/069413 dated May 26, 2010.
Office Action pertaining to Japanese Patent Application No. 2011-535260 dated Aug. 6, 2013.

* cited by examiner

*Primary Examiner* — Marc Zimmer
(74) *Attorney, Agent, or Firm* — Dinsmore & Shohl LLP

(57) ABSTRACT

The present invention provides a water- and oil-repellent soil-resistant composition comprising (A) a fluorine-containing polymer having repeating units derived from a monomer comprising a fluorine-containing monomer and (B) a silane compound. The water- and oil-repellent soil-resistant composition comprising the fluorine-containing acrylate polymer can impart the excellent water- and oil-repellency and soil resistance to the porous substrate and is free from an organic solvent.

12 Claims, No Drawings

METHOD OF PREPARING WATER- AND OIL-REPELLENT SOIL-RESISTANT COMPOSITION

CROSS REFERENCE TO RELATED APPLICATIONS

This application has priority from U.S. Application No. 61/113,320 filed Nov. 11, 2008, disclosures of which are incorporated herein by reference.

TECHNICAL FIELD

This invention relates to a water- and oil-repellent soil-resistant composition imparting excellent water repellency, oil repellency and soil resistance, to a substrate such as a masonry. The water- and oil-repellent soil-resistant composition is free from an organic solvent.

BACKGROUND ARTS

It is studied that water and oil repellency and soil resistance are imparted by treating a surface of substrate such as a masonry, glass, ceramics, textiles, paper, wood, leather, metal and plastics with a compound having a fluoroalkyl group (Rf group). For example, efforts are made for the purpose that water and oil repellency and soil resistance are imparted by treating a surface of a masonry such as stone, brick, concrete and tile by the following methods.

For example, JP-A-57-23662 discloses that an acrylate having a Rf group is coated on a concrete and a stone to form a protective film. JP-A-07-109317 and WO-2004/041880 disclose a treatment agent comprising a fluorine-containing copolymer comprising a monomer having a Rf group, and a silicone-based vinyl monomer. WO-2004/108779 and WO-2007/127267 disclose a treatment agent comprising a fluorine-containing copolymer comprising a fluoromonomer which has been substituted in the alfa-position. JP-A-11-507687 discloses a masonry-treatment agent comprising a water-soluble polymer having a Rf group, a carboxyl group, an oxyalkylene group and a silyl group. EP1225187 discloses the treatment of ceramics with a polymer having a silyl group which comprises a Rf group-containing monomer, a fluorine-free monomer and a silyl group-containing monomer.

These treatment agents, however, contain an organic solvent which evolves an uncomfortable smell, or the organic solvent is removed after the polymer was prepared in an organic solvent.

Recent study results (EPA Report "PRELIMINARY RISK ASSESSMENT OF THE DEVELOPMENTAL TOXICITY ASSOCIATED WITH EXPOSURE TO PERFLUOROOCTANOIC ACID AND ITS SALTS" (http://www.epa.gov/opptintr/pfoa/pfoara.pdf)) and the like clarify that a PFOA (perfluorooctanoic acid) doubtfully has a potential risk of environmental load. EPA (Environmental Protection Agency of USA) announced on Apr. 14, 2003 that the EPA intensifies the scientific investigation.

On the other hand, Federal Register (FR Vol. 68, No. 73/Apr. 16, 2003 [FRL-7303-8]) (http://www.epa.gov/opptintr/pfoa/pfoafr.pdf), EPA Environmental News for release Monday April, 2003 "EPA INTENSIFIES SCIENTIFIC INVESTIGATION OF A CHEMICAL PROCESSING AID" (http://www.epa.gov/opptintr/pfoa/pfoaprs.pdf), and EPA OPPT FACT SHEET Apr. 14, 2003 (http://www.epa.gov/opptintr/pfoa/pfoafacts.pdf) announced that a fluorinated "telomer" may metabolize or decompose to PFOA. It is also announced that the telomer is used in a large number of commercial products including fire fighting foams, care products and cleaning products as well as soil, stain and grease resistant coating on carpets, textiles, paper, and leather.

PROBLEMS TO BE SOLVED BY THE INVENTION

An object of the present invention is to provide a surface treatment agent (that is, a water- and oil-repellent soil-resistant composition) comprising a fluorine-containing acrylate polymer which can impart excellent water- and oil-repellency and soil resistance to a substrate and which does not contain an organic solvent. Since the organic solvent generally evolves an uncomfortable smell during a process of applying the surface treatment agent, the absence of the organic solvent is preferable during the preparation of fluorine-containing acrylate polymer.

SUMMARY OF THE INVENTION

The present inventors discovered that the above-mentioned object can be achieved by a method of preparing a fluorine-containing polymer, comprising: polymerizing (A) a monomer comprising a fluorine-containing monomer in the presence of (B) a silane compound to give a mixture of a fluorine-containing polymer and the silane compound.

The present invention provides a water- and oil-repellent soil-resistant composition produced by the above-mentioned method, which comprises a mixture of (A) a fluorine-containing polymer and (B) a silane compound.

EFFECTS OF THE INVENTION

According to the present invention, the water- and oil-repellent soil-resistant composition comprising the fluorine-containing acrylate polymer can impart the excellent water- and oil-repellency and soil resistance to the porous substrate. In the present invention, a liquid medium for dispersing (or solving) the monomers for the preparation of the fluorine-containing polymer does not contain the organic solvent. The water- and oil-repellent soil-resistant composition obtained after the polymerization does not contain an organic solvent which evolves an uncomfortable smell during a process of applying the water- and oil-repellent soil-resistant composition. Most of the organic solvents correspond to Volatile Organic Compound (VOC). The organic solvent which is not reactive to substrate includes VOC, but in the present invention the silane compound which is reactive to substrate is effective for reduction of VOC.

MODE FOR CARRYING OUT THE INVENTION (A) Fluorine-Containing Polymer

In the present invention, the monomer (A) forming the fluorine-containing polymer comprises:
(a) a fluorine-containing monomer,
(b) optionally present, a fluorine-free monomer other than a crosslinkable monomer, and
(c) optionally present, a crosslinkable monomer.

The fluorine-containing polymer (A) may be a homopolymer formed from one monomer or a copolymer formed from at least two monomers.

The homopolymer has the repeating units derived from the fluorine-containing monomer (a). The copolymer may have the repeating units derived from at least two fluorine-containing monomers (a), or may have, in addition to the repeating units derived from the fluorine-containing monomer (a), the repeating units derived from the fluorine-free monomer (b) and optionally the crosslinkable monomer (c).

The fluorine-containing polymer (A) constituting the water- and oil-repellent soil-resistant composition of the present invention comprises:
(a) the fluorine-containing monomer, and
optionally (b) the fluorine-free monomer other than the crosslinkable monomer, and
optionally (c) the crosslinkable monomer.

The fluorine-containing monomer (a) is a compound of the formula:

$$CH_2=C(-X)-C(=O)-O-Y-Rf \qquad (I)$$

wherein X is a hydrogen atom, an linear or branched alkyl group having 1 to 21 carbon atoms, a halogen atom (such as a fluorine atom, a chlorine atom, a bromine atom, a iodine atom), a $CFX^1X^2$ group (wherein $X^1$ and $X^2$ is a hydrogen atom, a fluorine atom, a chlorine atom, a bromine atom or a iodine atom), a cyano group, a linear or branched fluoroalkyl group having 1 to 21 carbon atoms, a substituted or unsubstituted benzyl group, or a substituted or unsubstituted phenyl group,
Y is a direct bond, or an optionally substituted hydrocarbon group having 1 to 10 carbon atoms, preferably an aliphatic group having 1 to 10 carbon atoms, an aromatic or cycloaliphatic group having 6 to 10 carbon atoms,
a $-CH_2CH_2N(R^1)SO_2-$ group (wherein $R^1$ is an alkyl group having 1 to 4 carbon atoms) or
$-CH_2CH(OY^1)CH_2-$ group (wherein $Y^1$ is a hydrogen atom or an acetyl group),
Rf is a linear or branched fluoroalkyl or fluoroalkenyl group having 1 to 21 carbon atoms, or a fluoroether group having totally 1 to 200 repeating units selected from the group consisting of the repeating units: $-C_3F_6O-$, $-C_2F_4O-$ and $-CF_2O-$.

The alpha-position of the fluorine-containing monomer may be substituted with a halogen atom or the like. Accordingly, in the formula (I), X may be an linear or branched alkyl group having 2 to 21 carbon atoms, a fluorine atom, a chlorine atom, a bromine atom, a iodine atom, a $CFX^1X^2$ group (wherein $X^1$ and $X^2$ is a hydrogen atom, a fluorine atom, a chlorine atom, a bromine atom or a iodine atom), a cyano group, a linear or branched fluoroalkyl group having 1 to 21 carbon atoms, a substituted or unsubstituted benzyl group, or a substituted or unsubstituted phenyl group.

When the Rf group in the formula (I) is a fluoroalkyl group, the Rf group is preferably a perfluoroalkyl group. The carbon number of the Rf group is from 1 to 21, for example, from 1 to 6, particularly from 4 to 6, especially 6. Examples of the Rf group include $-CF_3$, $-CF_2CF_3$, $-CF_2CF_2CF_3$, $-CF(CF_3)_2$, $-CF_2CF_2CF_2CF_3$, $-CF_2CF(CF_3)_2$, $-C(CF_3)_3$, $-(CF_2)_4CF_3$, $-(CF_2)_2CF(CF_3)_2$, $-CF_2C(CF_3)_3$, $-CF(CF_3)CF_2CF_2CF_3$, $-(CF_2)_5CF_3$, $-(CF_2)_3CF(CF_3)_2$, $-(CF_2)_4CF(CF_3)_2$, $-(CF_2)_7CF_3$, $-(CF_2)_5CF(CF_3)_2$, $-(CF_2)_6CF(CF_3)_2$, $-(CF_2)_9CF_3$, $-(CF_2)_2H$, $-CF_2CFHCF_3$, $-(CF_2)_4H$, $-(CF_2)_6H$, $-(CF_2)_8H$, and $-(CF_2)_{10}H$.

When the Rf group is the fluoroalkenyl group, examples of the Rf group include $-C(CF(CF_3)_2)=C(CF_3)(CF_2CF_2CF_3)$, $-C(CF(CF_3)_2)=C(CF_3)(CF(CF_3)_2)$ and $-C(CF_3)=C(CF(CF_3)_2)_2$.

When the Rf group is the fluoroether group, examples of the Rf group include $F(CF_2CF_2CF_2O)_aCF_2CF_2-$ and $F(CF(CF_3)CF_2O)_aCF(CF_3)-$ wherein "a", on average, is from 2 to 100, particularly 5 to 50, for example, 25.

Y is preferably an aliphatic group having 1 to 10 carbon atoms, an aromatic group or cycloaliphatic group having 6 to 10 carbon atoms, a $-CH_2CH_2N(R^1)SO_2-$ group ($R^1$ is an alkyl group having 1 to 4 carbon atoms) or a $-CH_2CH(OY^1)CH_2-$ group ($Y^1$ is a hydrogen atom or an acetyl group). The aliphatic group is preferably an alkylene group (particularly the carbon number is from 1 to 4, for example, 1 or 2). The aromatic group and cycloaliphatic group may be substituted or unsubstituted.

The examples of the fluorine-containing monomer (a) are as follows:

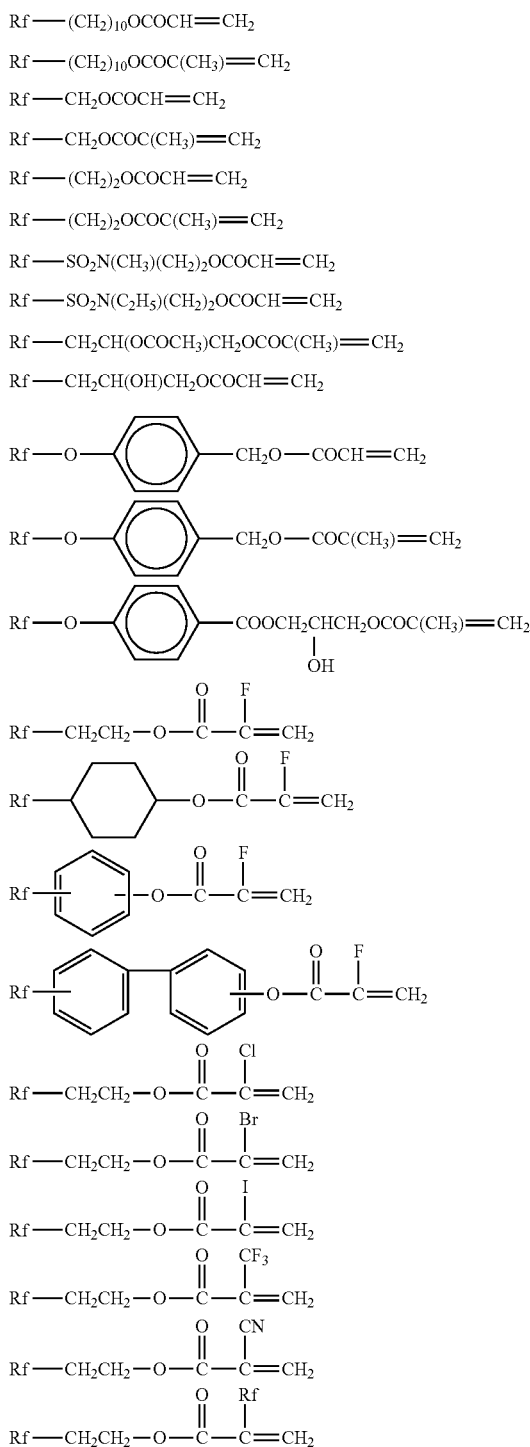

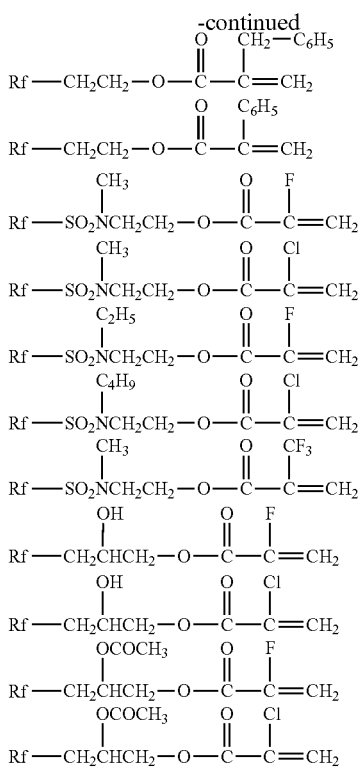

wherein Rf is a linear or branched fluoroalkyl or fluoroalkenyl group having 1 to 21 carbon atoms, or a fluoroether group having totally 1 to 200 repeating units selected from the group consisting of the repeating units: —$C_3F_6O$—, —$C_2F_4O$— and —$CF_2O$—.

The fluorine-containing polymer may have the repeating units derived from the fluorine-free monomer (b). The fluorine-free monomer (b) is other than the crosslinkable monomer (c). The monomer (b) is preferably a fluorine-free monomer having a carbon-carbon double bond. The monomer (b) is preferably a vinyl monomer which is free from fluorine. The fluorine-free monomer (b) is generally a compound having one carbon-carbon double bond.

Preferable examples of the fluorine-free monomer (b) may be a (meth)acrylate ester having an alkyl group. The number of carbon atoms of the alkyl group may be from 1 to 30, for example, from 4 to 22, e.g., from 8 to 18. For example, the fluorine-free monomer (b) may be acrylates of the general formula:

$$CH_2=CA^1COOA^2$$

wherein $A^1$ is a hydrogen atom, a methyl group, or a halogen atom (for example, a chlorine atom, a bromine atom and a iodine atom) other than a fluorine atom, and $A^2$ is an alkyl group represented by $C_nH_{2n+1}$ (n=1 to 30).

The fluorine-containing polymer may have the repeating units derived from a cyclic hydrocarbon group-containing (meth)acrylate monomer. Generally, the (meth)acrylate monomer having a cyclic hydrocarbon group is a monomer free from a fluorine atom. The (meth)acrylate monomer having a cyclic hydrocarbon group is a compound having a (preferably monovalent) cyclic hydrocarbon group and a monovalent (meth)acrylate group. The monovalent cyclic hydrocarbon group is directly bonded to the (meth)acrylate group. The cyclic hydrocarbon group includes saturated or unsaturated, monocyclic groups, polycyclic groups and bridged ring groups. The cyclic hydrocarbon group is preferably saturated. Preferably, the (meth)acrylate monomer has 4 to 20 carbon atoms. Examples of the cyclic hydrocarbon group includes an cycloaliphatic group having 4-20 carbon atoms, particularly 5-12 carbon atoms, an aromatic group having 6-20 carbon atoms, and an araliphatic group having 7-20 carbon atoms. The cyclic hydrocarbon group preferably has at most 15 carbon atoms, particularly at most 10 carbon atoms. Preferably, a carbon atom in a ring in the cyclic hydrocarbon group directly bonds to (an oxygen atom of) an ester group in the (meth)acrylate monomer. The cyclic hydrocarbon group is preferably a saturated cycloaliphatic group. Specific examples of the cyclic hydrocarbon group include a cyclohexyl group, a t-butyl cyclohexyl group, an isobornyl group, a dicyclopentanyl group and a dicyclopentenyl group. The (meth)acrylate group is an acrylate group and a methacrylate group, and is preferably a methacrylate group. Specific examples of the (meth)acrylate monomer having a cyclic hydrocarbon group include cyclohexyl methacrylate, t-butyl-cyclohexyl methacrylate, benzyl methacrylate, isobornyl methacrylate, isobornyl acrylate, dicyclopentanyl methacrylate, dicyclopentanyl acrylate, and dicyclopentenyl acrylate.

Examples of the fluorine-free monomer (b) include ethylene, vinyl acetate, vinyl halide such as vinyl chloride, vinylidene halide such as vinylidene chloride, acrylonitrile, styrene, polyethyleneglycol(meth)acrylate, polypropyleneglycol(meth)acrylate, methoxypolyethyleneglycol(meth)acrylate, methoxypolypropyleneglycol(meth)acrylate, vinyl alkyl ether. The fluorine-free monomer (b) is not limited to these examples. The fluorine-free monomer (b) may contain vinyl halide and/or vinylidene halide.

The fluorine-containing polymer may contain the repeating units derived from the crosslinkable monomer (c). The crosslinkable monomer (c) may be a fluorine-free vinyl monomer having at least two reactive groups and/or carbon-carbon atoms. The crosslinkable monomer (c) may be a compound having at least two carbon-carbon double bonds, or a compound having at least one carbon-carbon double bond and at least one reactive group. Examples of the reactive group include a silane group, a phosphate group (or a phosphoric acid group), a carboxylate group (or a carboxylic acid group), a sulfonate group (or a sulfonic acid group), a hydroxyl group, an epoxy group and an amino group.

Specific examples of the silane group-containing monomer are as follows:
$CH_2$=$CHCO_2(CH_2)_3Si(OCH_3)_3$,
$CH_2$=$CHCO_2(CH_2)_3Si(OC_2H_5)_3$,
$CH_2$=$C(CH_3)CO_2(CH_2)_3Si(OCH_3)_3$
(γ-methacryloxypropyltrimethoxysilane),
$CH_2$=$C(CH_3)CO_2(CH_2)_3Si(OC_2H_5)_3$,
$CH_2$=$CHCO_2(CH_2)_3SiCH_3(OC_2H_5)_2$,
$CH_2$=$C(CH_3)CO_2(CH_2)_3SiC_2H_5(OCH_3$,
$CH_2$=$C(CH_3)CO_2(CH_2)_3Si(CH_3)_2(OC_2H_5)$,
$CH_2$=$C(CH_3)CO_2(CH_2)_3Si(CH_3)_2OH$,
$CH_2$=$CHCO_2(CH_2)_3SiCH_3[ON(CH_3)C_2H_5]_2$,
$CH_2$=$C(CH_3)CO_2(CH_2)_3SiC_6H_5[ON(CH_3)C_2H_5]_2$,
$CH_2$=$CHSi(OCH_3)_3$,
$CH_2$=$CHSi(OC_2H_5)_3$,
$CH_2$=$CHSiCH_3(OCH_3)_2$,
$CH_2$=$CHSi(CH_3)_2(OC_2H_5)$,
$CH_2$=$CHSi(CH_3)_2SiCH_3(OCH_3)_2$,
$CH_2$=$CHSiCH_3[ON(CH_3)C_2H_5]_2$
vinyltrichlorosilane, and
vinyl tris(2-methoxyethoxy)silane.

Specific examples of a monomer having the phosphate group include 2-methacryloyloxyethyl acid phosphate, 2-acryloyloxyethyl acid phosphate, acid phosphoxypropyl methacrylate, 3-chloro-2-acid phosphoxypropyl methacrylate, and 2-methacryloyloxyethyl acid phosphate monoethanolamine half salt.

Specific examples of a monomer having the carboxylate group include methacrylic acid, acrylic acid, 2-methacryloyloxyethyl succinic acid, 2-acryloyloxyethyl succinic acid, 2-methacryloyloxyethyl phthalate, 2-acryloyloxyethyl phthalate, 2-methacryloyloxyethyl hexahydrophthalate, 2-acryloyloxyethyl hexahydrophthalate, 2-acryloyloxypropyl phthalate, 2-acryloyloxypropyl hexahydrophthalate, 2-acryloyloxypropyl tetrahydrophthalate, maleic anhydride and citraconic anhydride.

Specific examples of a monomer having the sulfonate group include acrylamide-tert.-butyl sulfonic acid, and 2-acrylamide-2-methylpropane sulfonic acid.

Specific examples of a monomer having the epoxy group include glycidyl methacrylate and glycidyl acrylate.

Examples of the crosslinkable monomer (c) include diacetoneacrylamide, (meth)acrylamide, N-methylolacrylamide, hydroxymethyl(meth)acrylate, hydroxyethyl(meth)acrylate, 3-chloro-2-hydroxypropyl(meth)acrylate, N,N-dimethylaminoethyl(meth)acrylate, N,N-diethylaminoethyl(meth)acrylate, butadiene, chloroprene, isoprene and glycidyl (meth)acrylate, to which the crosslinkable monomer is not limited.

The copolymerization with the monomer (b) and/or the monomer (c) can optionally improve various properties such as water- and oil-repellency and soil resistance; durability of said repellency and resistance; solubility in solvent.

In the fluorine-containing polymer, the amount of the fluorine-free monomer (b) may be from 0.1 to 100 parts by weight, for example, from 0.1 to 50 parts by weight, and the amount of the crosslinkable monomer (c) may be at most 50 parts by weight, for example, at most 20 parts by weight, particularly, from 0.1 to 15 parts by weight, based on 100 parts by weight of the fluorine-containing monomer (a).

The amount of the (meth)acrylate monomer having a cyclic hydrocarbon group may be from at most 100 parts by weight, for example, from 0.1 to 80 parts by weight, preferably from 1 to 50 parts by weight, based on 100 parts by weight of the fluorine-containing monomer (a).

The fluorine-containing polymer may have a weight-average molecular weight of 2,000 to 5,000,000, particularly 3,000 to 5,000,000, especially 10,000 to 1,000,000. The weight-average molecular weight (in terms of polystyrene) of the fluorine-containing polymer can be determined by GPC (Gel Permeation Chromatography).

(B) Silane Compound

The silane compound can for example be a silane of the general formula $R_4Si$, wherein each R is a monovalent organic group, which can be the same or different, denotes for example a hydrocarbon, substituted hydrocarbon, hydroxyl, hydrocarbonoxy or substituted hydrocarbonoxy group. Preferably at least one of the groups R in such a silane is a hydrocarbonoxy or substituted hydrocarbonoxy group. The silane can for example be a trialkoxysilane of the formula $R^2(R^3O)_3Si$ in which $R^2$ and $R^3$ each represent a monovalent organic group an optionally substituted hydrocarbyl group. $R^2$ can for example be an alkyl group having 1 to 18 carbon atoms optionally substituted by a hydroxyl, halogen, amino, alkoxy or epoxy group. Each $R^3$ can for example be an alkyl group having 1 to 6 carbon atoms such as a methyl, ethyl, isopropyl or phenyl group, or an acetyl group. The silane can alternatively be a dialkoxysilane of the formula $(R^2)_2(R^3O)_2Si$ or a monoalkoxysilane of the formula $(R^2)_3R^3OSi$ in which $R^2$ and $R^3$ each have the meanings given above. The silane can alternatively be a tetraalkoxysilane $(R^3O)_4Si$.

Examples of specific silanes that can be used in the composition of the invention are trialkoxysilanes such as methyltrimethoxysilane, methyltriethoxysilane, ethyltrimethoxysilane, isopropyltrimethoxysilane, isobutyltrimethoxysilane, isobutyltriethoxysilane, n-hexyltrimethoxysilane, n-octyltrimethoxysilane, n-octyltriethoxysilane, methyltriphenoxysilane, vinyltrimethoxysilane, vinyltriethoxysilane, vinyltriisopropoxysilane, 3-glycidylpropyltrimethoxysilane, 3 aminopropyltrimethoxysilane, 3-aminopropyltriethoxysilane, 3-amino-2-methylpropyltrimethoxysilane, 3 glycidyl-2-methylpropyltrimethoxysilane, 3-(2-aminoethylamino)-2-methylpropyltrimethoxysilane or stearyltrimethoxysilane, vinyltriacetoxysilane, dialkoxysilanes such as dimethyldimethoxysilane, dimethyldiethoxysilane, diisobutyldimethoxysilane, n-octylmethyldimethoxysilane, 3-glycidylpropylmethyldimethoxysilane, 3 aminopropylmethyldiethoxysilane or 3-(2-aminoethylamino)-2-methylpropylmethyl-dimethoxysilane, monoalkoxysilanes such as trimethylmethoxysilane, trimethylethoxysilane, triisobutylmethoxysilane, diisobutylmethylmethoxysilane or triethylmethoxysilane, or tetraalkoxysilanes such as tetraethoxysilane (ethyl orthosilicate) or a partially condensed ethylsilicate.

The fluorine-containing polymer can be produced by any polymerization method. The polymerization method includes, for example, solution polymerization and emulsion polymerization. The polymerization is generally conducted in the absence of an organic solvent.

In the polymerization process, the silane compound acts as a solvent or medium. The silane compound may be used in the amount within the range from 30 to 2,000 parts by weight, for example, from 50 to 1,000 parts by weight, e.g., from 100 to 300 parts by weight, based on 100 parts by weight of total of the monomers.

In the solution polymerization, there can be used a method of dissolving the monomer(s) into a silane compound in the presence of a polymerization initiator, replacing the atmosphere by nitrogen, and stirring the mixture with heating, for example, at the temperature within the range from 30° C. to 120° C. for 1 hour to 16 hours. Examples of the polymerization initiator include azobisisobutyronitrile, azobisisovaleronitrile, benzoyl peroxide, di-tert-butyl peroxide, lauryl peroxide, cumene hydroperoxide, t-butyl peroxypivalate and diisopropyl peroxydicarbonate. The polymerization initiator may be used in the amount within the range from 0.01 to 20 parts by weight, for example, from 0.01 to 10 parts by weight, based on 100 parts by weight of the monomers.

In the emulsion polymerization, there can be used a method of emulsifying monomers in the silane compound in the presence of a polymerization initiator and an emulsifying agent, replacing the atmosphere by nitrogen, and polymerizing with stirring, for example, at the temperature within the range from 50° C. to 80° C. for 1 hour to 10 hours. As the polymerization initiator, for example, water-soluble initiators (e.g., azobisisobutylamidine dihydrochloride, sodium peroxide, potassium persulfate and ammonium persulfate) and oil-soluble initiators (e.g., azobisisobutyronitrile, azobisisovaleronitrile, benzoyl peroxide, di-tert-butyl peroxide, lauryl peroxide, cumene hydroperoxide, t-butyl peroxypivalate and diisopropyl peroxydicarbonate) are used. The polymerization initiator may be used in the amount within the range from 0.01 to 10 parts by weight based on 100 parts by weight of the monomers.

In order to obtain a polymer dispersion, which is superior in storage stability, it is desirable that the monomers are dispersed in the silane compound by using an emulsifying device capable of applying a strong shearing energy (e.g., a high-pressure homogenizer and an ultrasonic homogenizer) and then polymerized with using the oil-soluble polymerization initiator. As the emulsifying agent, various emulsifying agents such as an anionic emulsifying agent, a cationic emulsifying agent and a nonionic emulsifying agent can be used in the amount within the range from 0.5 to 20 parts by weight based on 100 parts by weight of the monomers. When the monomers are not completely compatibilized, a compatibilizing agent capable of sufficiently compatibilizing them (e.g., a low-molecular weight monomer) is preferably added to these monomers. By the addition of the compatibilizing agent, the emulsifiability and polymerizability can be improved.

The composition of the present invention is usually a soil-resistant composition, particularly a water- and oil-repellent soil-resistant composition.

The water- and oil-repellent soil-resistant composition of the present invention is preferably in the form of a solution, an emulsion or an aerosol. The water- and oil-repellent soil-resistant composition generally comprises the fluorine-containing polymer and a medium (particularly a liquid medium, e.g., the silane compound). The concentration of the fluorine-containing polymer in the water- and oil-repellent soil-resistant composition may be, for example, from 0.1 to 50% by weight.

The water- and oil-repellent soil-resistant composition can be applied to a substrate to be treated by a know procedure. The application of the water- and oil-repellent soil-resistant composition can be conducted by immersion, spraying and coating. Usually, the water- and oil-repellent soil-resistant composition is diluted to give a treatment liquid, is adhered to surfaces of the substrate by a well-known procedure such as an immersion coating, a spray coating and a foam coating, and is dried. The water- and oil-repellent soil-resistant composition can be diluted with a liquid medium, such as silane compounds, which may be the same or different from the silane compound used for polymerization, such as trialkoxysilane, triacetoxysilane, dialkoxysilane, monoalkoxysilane, tetraalkoxysilane or partially condensed silicate. The water- and oil-repellent soil-resistant composition may be diluted with organic solvents such as petroleum hydrocarbon, alcohol, ether-alcohol, ester, ketone or halogenated hydrocarbon. The silane compounds (used for polymerization or for dilution) do not evolve an uncomfortable smell. The organic solvents for dilution are preferably ones which do not evolve the uncomfortable smell. The composition of the present invention obtained (immediately) after the polymerization does not contain the organic solvent, but the composition of the present invention obtained after the polymerization may be diluted with the organic solvents. Generally, the composition of the present invention does not have an uncomfortable smell during the process of applying the composition of the present invention.

The substrate is usually porous. Examples of the substrate include masonry such as stone. Examples of the masonry include stone, brick, concrete and tile. Examples of stone include natural stone (for example, marble, granite or limestone), and artificial stone.

The substrate can be glass, ceramics, textiles, paper, wood, leather, metal and plastics.

The treatment agent of the present invention applied to the substrate is free from an organic solvent. The treatment agent of the present invention may contain (C) an additive, in addition to the fluorine-containing polymer (A) and the silane compound (B).

Examples of the additive (C) include a silicon-containing compound, a wax and an acrylic polymer.

The silicon-containing compound is preferably a compound having at least one siloxane linkage.

The silicon-containing compound includes, for example, an alkyl silicate and a siliconate.

The alkyl silicate may be a compound represented by the following general formula (I):

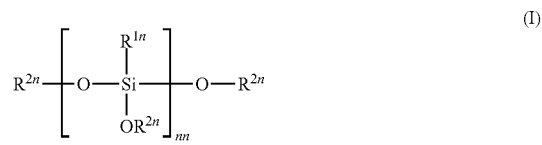

wherein $R^{1n}$ is an alkyl group containing 1 to 18 carbon atoms and, when nn is at least 2 or more, the $R^{1n}$ may be the same or different; $R^{2n}$ is a hydrogen atom or an alkyl group containing 1 to 5 carbon atoms and, when nn is 2 or more, the $R^{2n}$ groups may be the same or different; and nn is an integer of 1 to 20.

The alkyl group containing 1 to 18 carbon atoms as represented by $R^{1n}$ is not particularly restricted but includes, among others, a methyl group, an ethyl group, a propyl group, a butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group and an octadecyl group. These may be straight-chained or branched.

The alkyl group containing 1 to 5 carbon atoms as represented by $R^{2n}$ is not particularly restricted but includes, among others, methyl, ethyl, propyl, butyl and pentyl. These may be straight-chained or branched.

The symbol nn represents an integer of 1 to 20, for example an integer of 1 to 10.

As said silicon-containing compound, there may more specifically be mentioned, among others, methyltrimethoxysilane, ethyltrimethoxysilane, propyltrimethoxysilane, butyltrimethoxysilane, pentyltrimethoxysilane, hexyltrimethoxysilane, heptyltrimethoxysilane, octyltrimethoxysilane, nonyltrimethoxysilane, decyltrimethoxysilane, undecyltrimethoxysilane, dodecyltrimethoxysilane, tridecyltrimethoxysilane, tetradecyltrimethoxysilane, pentadecyltrimethoxysilane, hexadecyltrimethoxysilane, heptadecyltrimethoxysilane, octadecyltrimethoxysilane, methyltriethoxysilane, ethyltriethoxysilane, propyltriethoxysilane, butyltriethoxysilane, pentyltriethoxysilane, hexyltriethoxysilane, heptyltriethoxysilane, octyltriethoxysilane, nonyltriethoxysilane, decyltriethoxysilane, undecyltriethoxysilane, dodecyltriethoxysilane, tridecyltriethoxysilane, tetradecyltriethoxysilane, pentadecyltriethoxysilane, hexadecyltriethoxysilane, heptadecyltriethoxysilane, octadecyltriethoxysilane and so forth. Among them, methyltrimethoxysilane, methyltriethoxysilane, butyltrimethoxysilane, butyltriethoxysilane, hexyltriethoxysilane and octyltriethoxysilane are preferred.

The above-mentioned silicon-containing compounds may be used also in their dimer form as the silicon-containing compound in the present invention. As such, there may be mentioned those of general formula (I) in which nn is 2 or 3, for instance. Furthermore, those in which nn is up to 20 may be used as well.

The siliconate (particularly alkyl siliconate) is, for example, of the formula:

$$R^1{}_a Si(OR^2)_b(OM)_c.$$

wherein a is an integer of at least 0 (preferably 1),
b is an integer of at least 0 (preferably 2),
c is an integer of at least 1 (preferably 1) provided that the total of a, b and c is 4,
$R^1$ each is, the same or different, a hydrocarbon group having 1 to 18 carbon atoms,
$R^2$ each is, the same or different, a hydrogen atom or a hydrocarbon group having 1 to 18 carbon atoms, and
M each is, the same or different, an alkaline metal.

The hydrocarbon group may be, for example, an aliphatic hydrocarbon group (for example, an alkyl group), a cycloaliphatic hydrocarbon group, an aromatic hydrocarbon group or an araliphatic hydrocarbon group.

$R^1$ includes, for example, a methyl group, an ethyl group, a propyl group, an isopropyl group, a n-butyl group, an isobutyl group, a t-butyl group, a n-pentyl group, an isopentyl group, a neopentyl group, a t-pentyl group, a n-hexyl group, a n-heptyl group, a n-octyl group, an isooctyl group, a 2,2,4-trimethylpentyl group, a n-nonyl group, a n-decyl group, a n-dodecyl group, a n-octadecyl group, a cyclopentyl group, a cyclohexyl group, a cycloheptyl group, a methylcyclohexyl group, a phenyl group, naphtyl group, an anthryl group, a phenanthryl group, a tolyl group, a xylyl group, an ethylphenyl group, a benzyl group and a phenylethyl group. Among them, the methyl group, the ethyl group and the propyl group are preferable, and the methyl group is particularly preferable.

$R^2$ includes the hydrogen group, and the same examples of groups mentioned as in $R^1$. Among them, the hydrogen group, the methyl group and the ethyl group are preferable, and the hydrogen group is particularly preferable.

M includes Li, Na and K. Particularly Na is preferable.

Specific examples of alkyl siliconate include sodium methyl siliconate [$CH_3Si(OH)_2(ONa)$] and potassium ethyl siliconate [$C_2H_5Si(OH)_2(OK)$].

The amount of the additive (C) may be from 0 to 2000 parts by weight, for example, from 0 to 200 parts by weight, e.g., from 0.1 to 50 parts by weight, based on 100 parts by weight of the fluorine-containing polymer (A).

The treatment agent may contain another water repellent agent, another oil repellent agent, a drying speed controlling agent, a crosslinking agent, a film forming agent, a compatibilizing agent, a surfactant, an antifreezing agent, a viscosity-adjusting agent, an ultraviolet absorbing agent, an antioxidant, a pH adjuster, a defoaming agent, a slippage controlling agent, antistatic agent, a hydrophilizing agent, an antibacterial agent, an antiseptic agent, an insecticide agent, an aromatic agent, a flame retardant, a color tone controlling agent, etc. in addition to the above-mentioned components (A)-(C) according to necessity.

The term "treatment" means that the treatment agent is applied to the substrate by immersion, spray, coating or the like. The fluorine-containing polymer which is an active component of the treatment agent can penetrate the internal of the substrate or can adhere on the surface of the substrate by the treatment.

EXAMPLES

The following Preparative Examples and Examples further illustrate the present invention in detail but are not to be construed to limit the scope thereof.

The properties are measured by the following procedures.

Smell

The smell during the process of coating was evaluated by sense of smell according to the following criteria A: Weak (Soft), B: Medium, C: Strong (Uncomfortable)

Soil Resistance

A soil was put on a treated substrate, and droplets were left for 24 hours and wiped off with a paper towel. The evaluation was conducted according to the following criteria.

1: Deep stain, and oil droplet widely spread
2: Deep stain, and slight or no oil droplet spread
3: Moderate stain, and no spread
4: Slight stain
5: No stain.

Example 1

Into a 200 cc four-necked flask equipped with a stirrer, an inert gas inlet, a condenser and a thermometer, 13.0 g of $CF_3CF_2(CF_2CF_2)_2CH_2CH_2OCOC(CH_3)\!\!=\!\!CH_2$, 6.5 g of methyl methacrylate, 0.5 g of γ-methacryloxypropyltrimethoxysilane (SZ6030 manufactured by Dow Corning Toray Co., Ltd.) and 60.0 g of methyltrimethoxysilane were charged and heated to 60° C. 0.8 g of t-butyl peroxypivalate was added and the polymerization reaction was conducted with stirring at 60° C. for at least 12 hours. A gas chromatography revealed that a polymerization reaction conversion was at least 97%. The resultant polymer solution was diluted with methyltrimethoxysilane to give a treatment liquid having a solid content of 3%.

A surface of each of polished natural granite and limestone (purchased from Inax Corp.) and a surface of concrete (prepared by ISO formulation) were coated with the treatment liquid (1 mL of the treatment liquid was applied to an area of 5 cm×10 cm). During the process of coating, the smell evaluation was conducted. After left at room temperature for 10 minutes, a superfluous treatment liquid was wiped off. After left at room temperature for 24 hours, the soil resistance test was conducted.

The results are shown in Table 1.

Example 2

Into the same apparatus as in Example 1, 13.0 g of $CF_3CF_2(CF_2CF_2)_2CH_2CH_2OCOC(CH_3)\!\!=\!\!CH_2$, 6.5 g of methyl methacrylate, 0.5 g of γ-methacryloxypropyltrimethoxysilane and 60.0 g of isobutyltrimethoxysilane were charged and heated to 60° C. 0.8 g of t-butyl peroxypivalate was added and the polymerization reaction was conducted with stirring at 60° C. for at least 12 hours. A gas chromatography revealed that a polymerization reaction conversion was at least 97%. In the same manner as in Example 1, the polymer solution was diluted with isobutyltrimethoxysilane to adjust the solid concentration to 3% and the treatment was conducted. The results of smell and soil resistance are shown in Table 1.

Example 3

The polymerization reaction was conducted to give a polymer solution in the same procedure as in Example 2 except that $CF_3CF_2(CF_2CF_2)_2CH_2CH_2OCOC(CH_3)\!\!=\!\!CH_2$ was changed to $CF_3CF_2(CF_2CF_2)_2CH_2CH_2OCOCH\!\!=\!\!CH_2$. In the same manner as in Example 1, the polymer solution was diluted with isobutyltrimethoxysilane to adjust the solid concentration to 3% and the treatment was conducted. The results of smell and soil resistance are shown in Table 1.

Example 4

The polymerization reaction was conducted to give a polymer solution in the same procedure as in Example 2 except that methyl methacrylate was changed to isobornyl methacrylate. In the same manner as in Example 1, the polymer solution was diluted with isobutyltrimethoxysilane to adjust the solid concentration to 3% and the treatment was conducted. The results of smell and soil resistance are shown in Table 1.

Example 5

Into the same apparatus as in Example 1, 20.0 g of $CF_3CF_2(CF_2CF_2)_2CH_2CH_2OCOC(CH_3)=CH_2$, 17.0 g of isobornyl methacrylate, 2.0 g of methyl methacrylate, 1.0 g of γ-methacryloxypropyltrimethoxysilane and 40.0 g of isobutyltrimethoxysilane were charged and heated to 60° C. 0.8 g of t-butyl peroxypivalate was added and the polymerization reaction was conducted with stirring at 60° C. for at least 12 hours. A gas chromatography revealed that a polymerization reaction conversion was at least 97%. In the same manner as in Example 1, the polymer solution was diluted with isobutyltrimethoxysilane to adjust the solid concentration to 3% and the treatment was conducted. The results of smell and soil resistance are shown in Table 1.

Example 6

The polymerization reaction was conducted to give a polymer solution in the same procedure as in Example 5 except that isobutyltrimethoxysilane was changed to isobutyltriethoxysilane. In the same manner as in Example 1, the polymer solution was diluted with isobutyltriethoxysilane to adjust the solid concentration to 3% and the treatment was conducted. The results of smell and soil resistance are shown in Table 1.

Example 7

The polymerization reaction was conducted to give a polymer solution in the same procedure as in Example 5 except that isobutyltrimethoxysilane was changed to tetraethoxysilane. In the same manner as in Example 1, the polymer solution was diluted with tetraethoxysilane to adjust the solid concentration to 3% and the treatment was conducted. The results of smell and soil resistance are shown in Table 1.

Example 8

The polymerization reaction was conducted to give a polymer solution in the same procedure as in Example 5. In the same manner as in Example 1, the polymer solution was diluted with the mixture (isobutyltrimethoxysilane:petroleum hydrocarbon solvent Exxsol D40 manufactured by Exxon Mobil=4:6 in mass ratio) to adjust the solid concentration to 3% and the treatment was conducted. The results of smell and soil resistance are shown in Table 1.

Example 9

The polymerization reaction was conducted to give a polymer solution in the same procedure as in Example 5 except that isobutyltrimethoxysilane was changed to isobutyltriethoxysilane. In the same manner as in Example 1, the polymer solution was diluted with the mixture (isobutyltriethoxysilane:Exxsol D40=4:6 in mass ratio) to adjust the solid concentration to 3% and the treatment was conducted. The results of smell and soil resistance are shown in Table 1.

Example 10

Into the same apparatus as in Example 1, 13.0 g of $CF_3CF_2(CF_2CF_2)_2CH_2CH_2OCOC(CH_3)=CH_2$, 7.0 g of stearyl acrylate and 60.0 g of methyltrimethoxysilane were charged and heated to 70° C. 0.2 g of azobisisobutyronitrile was added and the polymerization reaction was conducted with stirring at 70° C. for at least 12 hours. A gas chromatography revealed that a polymerization reaction conversion was at least 97%. The resultant polymer solution was diluted with the mixture (methyltrimethoxysilane:Exxsol D40=4:6 in mass ratio) to give a treatment liquid having a solid content of 3% and the treatment was conducted. The results of smell and soil resistance are shown in Table 1.

Example 11

Into the same apparatus as in Example 1, 13.0 g of $CF_3CF_2(CF_2CF_2)_2CH_2CH_2OCOC(CH_3)=CH_2$, 6.5 g of stearyl acrylate, 0.5 g of γ-methacryloxypropyltrimethoxysilane and 60.0 g of isobutyltrimethoxysilane were charged and heated to 60° C. 0.2 g of azobisvaleronitrile was added and the polymerization reaction was conducted with stirring at 60° C. for at least 12 hours. A gas chromatography revealed that a polymerization reaction conversion was at least 97%. In the same manner as in Example 1, the polymer solution was diluted with isobutyltrimethoxysilane to adjust the solid concentration to 3% and the treatment was conducted. The results of smell and soil resistance are shown in Table 1.

Example 12

Into the same apparatus as in Example 1, 13.0 g of $CF_3CF_2(CF_2CF_2)_2CH_2CH_2OCOC(CH_3)=CH_2$, 6.5 g of stearyl acrylate, 0.5 g of γ-methacryloxypropyltrimethoxysilane and 60.0 g of n-octyltriethoxysilane were charged and heated to 60° C. 0.8 g of t-butyl peroxypivalate was added and the polymerization reaction was conducted with stirring at 60° C. for at least 12 hours. A gas chromatography revealed that a polymerization reaction conversion was at least 97%. In the same manner as in Example 1, the polymer solution was diluted with the mixture (isobutyltrimethoxysilane:Exxsol D40=4:6 in mass ratio) to adjust the solid concentration to 3% and the treatment was conducted. The results of smell and soil resistance are shown in Table 1.

Comparative Example 1

The soil resistance test was conducted in the same manner as in Example 1, except that the treatment liquid was not coated on substrate. The results of smell and soil resistance are shown in Table 1.

Comparative Example 2

The polymerization reaction was conducted to give a polymer solution in the same procedure as in Example 1 except that methyltrimethoxysilane was changed to Exxsol D40. The polymerization reaction gave a precipitation so that a homogeneous treatment liquid could not be obtained.

Comparative Example 3

The polymerization reaction was conducted to give a polymer solution in the same procedure as in Example 1 except that methyltrimethoxysilane was changed to n-butyl acetate. In the same manner as in Example 1, the polymer solution was diluted with n-butyl acetate to adjust the solid concentration to 3% and the treatment was conducted. The results of smell and soil resistance are shown in Table 1.

Comparative Example 4

The polymerization reaction was conducted to give a polymer solution in the same procedure as in Example 5 except that isobutyltrimethoxysilane was changed to n-butyl acetate. In the same manner as in Example 1, the polymer solution was diluted with n-butyl acetate to adjust the solid concentration to 3% and the treatment was conducted. The results of smell and soil resistance are shown in Table 1.

Comparative Example 5

The polymerization reaction was conducted to give a polymer solution in the same procedure as in Example 5 except that isobutyltrimethoxysilane was changed to n-butyl acetate. In the same manner as in Example 1, the polymer solution was diluted with the mixture (isobutyltrimethoxysilane:Exxsol D40=4:6 in mass ratio) to adjust the solid concentration to 3% and the treatment was conducted. The results of smell and soil resistance are shown in Table 1.

Comparative Example 6

The polymerization reaction was conducted to give a polymer solution in the same procedure as in Example 11 except that isobutyltrimethoxysilane was changed to n-butyl acetate. In the same manner as in Example 1, the polymer solution was diluted with n-butyl acetate to adjust the solid concentration to 3% and the treatment was conducted. The results of smell and soil resistance are shown in Table 1.

TABLE 1

Smell and Soil resistance (granite/limestone/concrete)

|  | Smell | Olive Oil | Waste Oil | Red Wine | Coffee |
|---|---|---|---|---|---|
| Ex. 1 | A | 5/5/3 | 5/5/3 | 5/5/4 | 5/5/4 |
| Ex. 2 | A | 5/5/3 | 5/5/3 | 5/5/4 | 5/5/4 |
| Ex. 3 | A | 4/4/3 | 4/4/3 | 5/4/3 | 5/4/3 |
| Ex. 4 | A | 5/5/3 | 5/5/3 | 5/4/4 | 5/5/4 |
| Ex. 5 | A | 5/5/3 | 5/5/3 | 5/4/4 | 5/5/4 |
| Ex. 6 | A | 4/4/4 | 4/4/4 | 5/4/4 | 5/5/4 |
| Ex. 7 | A | 5/5/3 | 5/5/3 | 5/4/4 | 5/5/4 |
| Ex. 8 | A | 5/5/4 | 5/5/4 | 5/4/4 | 5/5/4 |
| Ex. 9 | A | 5/5/4 | 5/5/4 | 5/4/4 | 5/5/4 |
| Ex. 10 | A | 3/3/3 | 3/3/3 | 3/4/3 | 3/4/3 |
| Ex. 11 | A | 4/3/3 | 4/3/3 | 4/4/4 | 4/4/4 |
| Ex. 12 | A | 4/3/4 | 4/3/4 | 4/4/4 | 4/4/4 |
| Com. Ex. 1 | — | 1/1/1 | 1/1/1 | 1/1/1 | 1/1/1 |
| Com. Ex. 2 | A | Could not be measured, since homogeneous treatment liquid could not be obtained. | | | |
| Com. Ex. 3 | C | 5/5/3 | 5/5/3 | 5/5/3 | 5/5/3 |
| Com. Ex. 4 | C | 5/5/3 | 5/5/3 | 5/4/3 | 5/5/3 |
| Com. Ex. 5 | B | 5/5/4 | 5/5/4 | 5/4/4 | 5/5/4 |
| Com. Ex. 6 | C | 3/3/3 | 3/3/3 | 3/4/3 | 3/4/3 |

The invention claimed is:

1. A method of preparing a fluorine-containing polymer, comprising:
   polymerizing (A) a monomer comprising a fluorine-containing monomer in the presence of (B) a silane compound to give a mixture of a fluorine-containing polymer and the silane compound; wherein said fluorine-containing monomer is of the formula:

$$CH_2=C(-X)-C(=O)-O-Y-Rf \qquad (I)$$

wherein X is a hydrogen atom, an linear or branched alkyl group having 1 to 21 carbon atoms, a halogen atom, a $CFX^1X^2$ group (wherein $X^1$ and $X^2$ is a hydrogen atom or a halogen atom), a cyano group, a linear or branched fluoroalkyl group having 1 to 21 carbon atoms, a substituted or unsubstituted benzyl group, or a substituted or unsubstituted phenyl group,
   Y is a direct bond,
   an aliphatic group having 1 to 10 carbon atoms,
   an aromatic or cycloaliphatic group having 6 to 10 carbon atoms,
   a $-CH_2CH_2N(R^1)SO_2-$ group,
   wherein $R^1$ is an alkyl group having 1 to 4 carbon atoms, or
   $-CH_2CH(OY^1)CH_2-$ group,
   wherein $Y^1$ is a hydrogen atom or an acetyl group, and
   Rf is a linear or branched fluoroalkyl or fluoroalkenyl group having 1 to 21 carbon atoms, or a fluoroether group having totally 1 to 200 repeating units selected from the group consisting of the repeating units: $-C_3F_6O-$, $-C_2F_4O-$ and $-CF_2O-$.

2. The method according to claim 1, wherein the monomer (A) further comprises:
   (b) a fluorine-free monomer, and
   (c) optionally present, a crosslinkable monomer,
   in addition to (a) the fluorine-containing monomer.

3. The method according to claim 1, wherein the Rf is a fluoroalkyl group having 1 to 6 carbon atoms.

4. The method according to claim 1, wherein the Rf group is a perfluoroalkyl group.

5. The method according to claim 2, wherein the fluorine-free monomer (b) is an acrylate of the general formula:

$$CH_2=CA^1COOA^2$$

wherein $A^1$ is a hydrogen atom, a methyl group or a halogen atom other than a fluorine atom, and $A^2$ is a hydrocarbon group having 1 to 30 carbon atoms, particularly an alkyl group represented by $C_nH_{2n+1}$ wherein n is 1 to 30.

6. The method according to claim 2, wherein the fluorine-free monomer (b) is a (meth)acrylate monomer having a cyclic hydrocarbon group.

7. The method according to claim 2, wherein the crosslinkable monomer (c) is a monomer having at least two reactive groups, a monomer having least two carbon-carbon double bonds, or a monomer having at least one carbon-carbon double bond and at least one reactive group.

8. The method according to claim 1, wherein the silane compound is of the formula:

$$R_4Si$$

wherein each R is a monovalent organic group, which can be the same or different, denotes a hydrocarbon, substituted hydrocarbon, hydroxyl, hydrocarbonoxy or substituted hydrocarbonoxy group.

9. The method according to claim 1, wherein the silane compound is a trialkoxysilane, triacetoxysilane, dialkoxysilane, monoalkoxysilane, tetraalkoxysilane or partially condensed silicate.

10. The method according to claim 1 which is conducted in the absence of an organic solvent.

11. A masonry substrate having a water- and oil-repellent soil resistant composition applied thereto comprising:

(A) a fluorine-containing polymer comprising repeating units derived from a fluorine-containing monomer of the formula:

$$CH_2=C(-X)-C(=O)-O-Y-Rf \quad (I)$$

wherein X is a hydrogen atom, an linear or branched alkyl group having 1 to 21 carbon atoms, a halogen atom, a $CFX^1X^2$ group (wherein $X^1$ and $X^2$ is a hydrogen atom or a halogen atom), a cyano group, a linear or branched fluoroalkyl group having 1 to 21 carbon atoms, a substituted or unsubstituted benzyl group, or a substituted or unsubstituted phenyl group, Y is a direct bond,
an aliphatic group having 1 to 10 carbon atoms,
an aromatic or cycloaliphatic group having 6 to 10 carbon atoms,
a $-CH_2CH_2N(R^1)SO_2-$ group,
wherein $R^1$ is an alkyl group having 1 to 4 carbon atoms, or
$-CH_2CH(OY^1)CH_2-$ group,
wherein $Y^1$ is a hydrogen atom or an acetyl group, and Rf is a linear or branched fluoroalkyl or fluoroalkenyl group having 1 to 21 carbon atoms, or a fluoroether group having totally 1 to 200 repeating units selected from the group consisting of the repeating units: $-C_3F_6O-$, $-C_2F_4O-$ and $-CF_2O-$; and (B) a silane compound; wherein said composition does not contain an organic solvent.

12. The masonry substrate of claim 11, wherein said composition further contains at least one dilution medium comprising a silane compound which is different than silane compound (B).

\* \* \* \* \*

UNITED STATES PATENT AND TRADEMARK OFFICE
CERTIFICATE OF CORRECTION

| | | |
|---|---|---|
| PATENT NO. | : 8,674,031 B2 | Page 1 of 1 |
| APPLICATION NO. | : 13/128464 | |
| DATED | : March 18, 2014 | |
| INVENTOR(S) | : Akihiko Ueda et al. | |

It is certified that error appears in the above-identified patent and that said Letters Patent is hereby corrected as shown below:

In the Claims

Col. 16, Line 49, Claim 7, "having least two carbon-carbon" should read --having at least two carbon-carbon--.

Signed and Sealed this
Seventeenth Day of February, 2015

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,674,031 B2 | Page 1 of 1 |
| APPLICATION NO. | : 13/128464 | |
| DATED | : March 18, 2014 | |
| INVENTOR(S) | : Ueda et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 219 days.

Signed and Sealed this
Twenty-third Day of June, 2015

Michelle K. Lee
*Director of the United States Patent and Trademark Office*